Oct. 24, 1944.　　　　　L. COES, JR　　　　　2,361,269
FLOW METER
Filed April 1, 1944
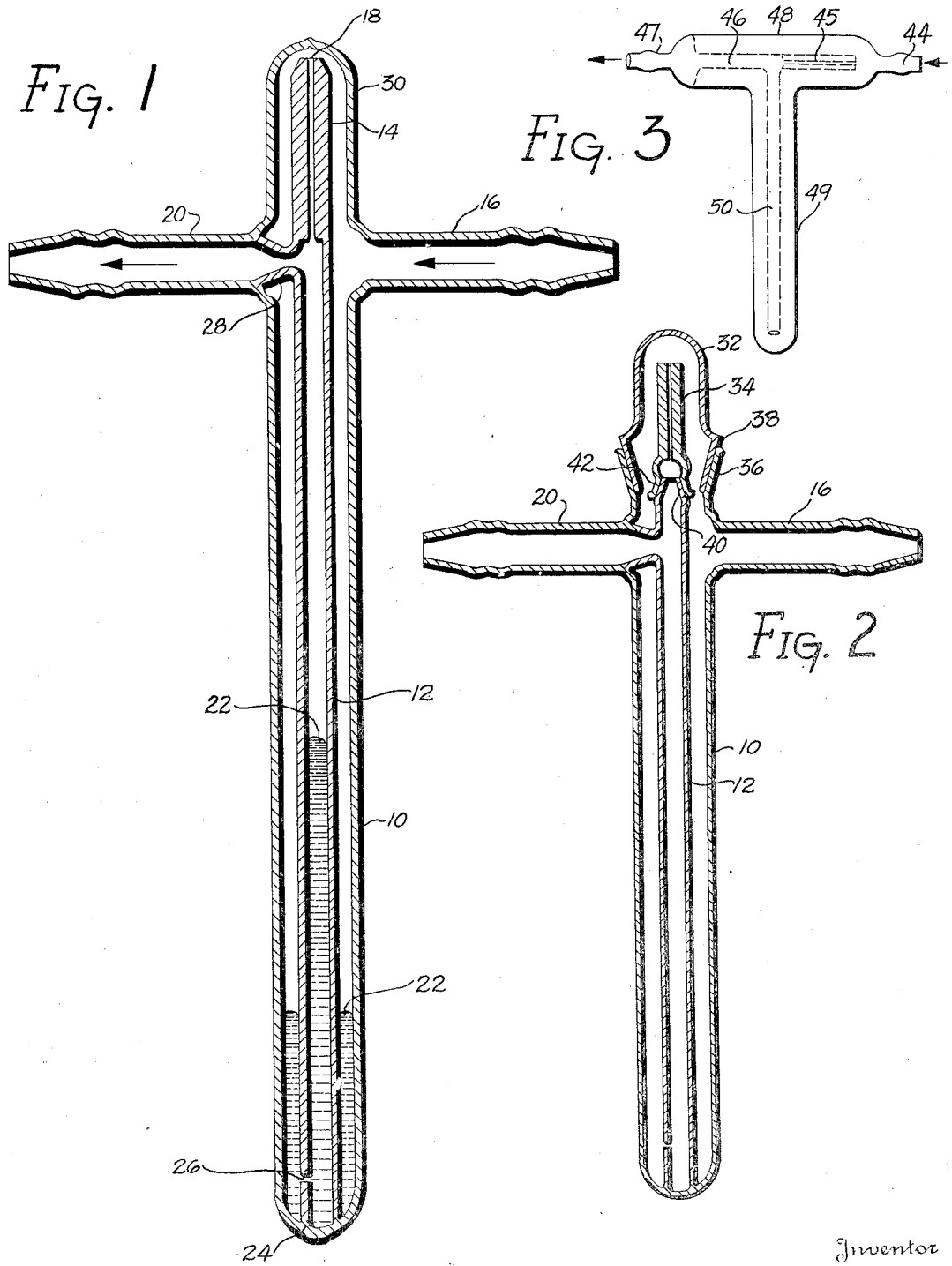
Inventor
LORING COES, JR.
By Clayton L. Jenks
Attorney Patented Oct. 24, 1944

2,361,269

UNITED STATES PATENT OFFICE 2,361,269

FLOWMETER

Loring Coes, Jr., Brookfield, Mass.

Application April 1, 1944, Serial No. 529,125

4 Claims. (Cl. 73—211)

This invention relates to flow meters and more particularly to a device which measures the rate of flow of a gas by indicating the pressure difference between the opposite ends of a capillary tube through which the gas passes.

Heretofore apparatus of this type has comprised a U-shaped glass tube connected at its ends to inlet and outlet tubes which are in turn interconnected by means of a capillary tube. Owing to the fragile nature of such apparatus, the U tube has had to be mounted permanently on a stand. The position of the meniscus at the top of the fluid in each branch of the U tube is determined by means of a sliding scale fixed to the stand. The structure has been complex and likely to break at various places and particularly adjacent to the point of fastening the U tube to the inlet and outlet gas tubes. Normal use of the apparatus requires that rubber tubes be connected to the inlet and outlet ends, and this of course may require a considerable force. The U tubes cannot be rigidly clamped in position on the supporting stand, since the metal straps employed for the purpose would set up strains in the glass if they were made too tight. But if the clamping straps are too loose, then the force required to put the rubber tubes in place is not properly resisted by the clamps with the result that the U tube may break. Various problems in manufacture have been involved because of the necessity for making a closed circuit passage including the U tube and a connecting link between the inlet and outlet of the apparatus. This has required complex glass blowing procedure and has necessitated an unduly large number of seals. In particular, it has been difficult to connect the two arms of the U tube properly to the remainder of the assembled apparatus without setting up strains which would be likely to cause breakage.

The primary object of this invention is to overcome the above problems and to provide a simple type of apparatus which may be readily manufactured and will give a long life of useful service.

A further object is to provide a construction which may be held in a standard laboratory clamp and need not be permanently mounted on a standard, and which is so constructed that rubber tubes may be readily connected thereto without serious liability of breakage.

A further object of the invention is to provide a construction of the above type wherein the capillary tube thereof may be readily exchanged for one of a different bore so that the apparatus may be used to measure the bow of gases of different viscosities. Further objects will be apparent or pointed out in the following disclosure.

Referring to the drawing which illustrates preferred embodiments of the invention:

Fig. 1 is a vertical section through one form of apparatus;

Fig. 2 is a vertical section through a modified type; and

Fig. 3 is a vertical elevation of another modification.

In accordance with this invention, I have provided a flow meter comprising a reservoir tube 10 closed at both ends which has a smaller pressure indicating tube 12 mounted therein and preferably concentric therewith. The tubes are made of suitable material, such as glass or a resinoid. A capillary tube 14 is connected to and forms a continuation of the inner tube 12. A gas inlet pipe 16, which is suitably shaped at its ends, as illustrated, for the purpose of readily slipping a rubber connecting hose thereover, is connected at its inner end to the outer tube 10 so as to form a passage communicating with the reservoir body. The outer open end 18 of the capillary tube communicates with the inlet passage, so that gas may travel from the pipe 16 through the capillary and thence through an outlet pipe 20 which communicates with the inside of the pressure tube 12. The outlet and inlet pipes 16 and 20 are preferably arranged in alignment or opposite each other, in order that the apparatus may be readily connected to other apparatus; but the tube 16 may communicate with the reservoir space at any suitable point above the normal level of the liquid 22 stored therein. The inner tube 12 is open at or near its lower end, so that the liquid 22 may seek a level in the two tubes under the pressure to which it is subjected. It is preferred to fuse or otherwise secure the lower end of the tube 12 to the bottom of the outer reservoir tube in order to provide a rigid structure. In that case, the inner tube is formed with an opening 26 through its side wall for the purpose of providing a communicating passage between the reservoir and inner tubes. It will be appreciated that when the device is held in a substantially vertical position with the capillary at the top, then if the liquid in the outer reservoir tube is subjected to a greater pressure than is the liquid in the inner tube, the liquid will rise in the inner tube to an extent which balances that pressure.

The manufacture of this device requires only simple operations, whether the device is made of glass or of other suitable materials. To make the structure illustrated in Fig. 1 of glass, the outer tube 10 is first provided with its lower end closed and the upper end open. The inner tube 12 is connected by a suitable glass blowing operation to the capillary tube 14. Then a small bubble is blown in the side of the tube 12 at a point where it will be opposite the outlet pipe 20 when assembled. This bubble is made large enough so that it will touch the outer tube when the parts are assembled. Then the inner tube is sealed at its bottom to the outer tube. Thereafter, the outer tube is heated opposite the glass bubble and the two parts are there connected with the formation of a short outwardly projecting tube at this point. That is, the bubble has now formed the inner tube wall 28. Then the outlet pipe 20, which is also suitably shaped for holding a rubber tube thereon, is sealed at its inner end to this projecting parts 28 and to the wall of the reservoir tube. This connects the pipe 20 only with the interior of the central tube 12 and the capillary. The inlet pipe 16 is then secured to the reservoir tube 10 at any suitable location and preferably in alignment with the outlet pipe. The upper end of the reservoir tube is then closed by drawing it out, so as to seal this outer tube at both ends.

A flow meter of this type is employed to measure the velocity of gas flow, provided the gas flow is not turbulent and its velocity lies within the range of the Newtonian viscous flow. The capillary tube provides a frictional resistance to the passage of gas therethrough, and this resistance causes a loss of pressure. Hence, there is a greater pressure in the inlet pipe 16 than in the outlet pipe 20. A suitable liquid such as mercury, water or other fluid of a desired density, is placed in required quantity in the reservoir tube as illustrated. Hence, when gas is flowing through the capillary tube the difference in pressure at the two ends of the capillary causes the fluid 22 to rise in the inner tube to that height which represents the friction loss of pressure involved in forcing the gas through the capillary tube. For a Newtonian flow, this pressure loss indicated by the difference in height of the menisci in the tubes is directly proportional to the amount of gas flow. Hence, it is easy to calibrate the device for a gas of a given viscosity so that one may thus read off the volume flow of gas. The inner tube 12 and the outer tube 10 may have suitable scale graduations marked thereon in inches, millimeters, or the like, so that the difference in level may be readily determined. Since the liquid flows upwardly in the inner tube and downwardly in the reservoir tube, the meniscus at the top of the fluid in the inner tube may be readily seen. Since there is a straight line curve relationship of this difference in scale readings to the velocity of gas flow, then a pressure of 1 inch as thus indicated would show that the gas flow is 0.5 of that indicated by a pressure difference of 2 inches.

The pressure difference at the two ends of the capillary tube depends upon the fineness of the bore of the tube. Hence, for measuring a larger flow, it is desirable to use a capillary of larger bore. To avoid having to provide several structures of different capillary sizes for this purpose, I have shown in Fig. 2 a construction which permits changing the capillary tube and readily providing one of the required bore size. The parts may be in the same arrangement as above described. The upper end of the reservoir tube 10 is open and provided with a removable cap 32. The capillary tube 34 is likewise made removable and interchangeable with tubes of other bore sizes. To satisfy these requirements, the upper end of the reservoir tube is provided with a flared open ended portion 36 having a ground glass surface shaped as the frustum of a cone. The cap 32 is likewise provided with a ground glass portion 38 which is adapted to make a tight fit within the part 36. These may be made in accordance with standard practice involved in fitting a glass stopper into the neck of a bottle. Similarly, the upper end of the inner tube 12 is shaped as a frustum 40 and provided with an exterior ground glass surface adapted to make a sealed joint with the flaring ground glass portion 42 formed as the bottom end of the capillary tube. It will be observed that this removable capillary tube is preferably made by securing a short piece of a wide bored glass tubing to the lower end of the capillary tube so that the ground glass seal may be readily formed. This construction is such that it is but a matter of a moment's time to remove the outer cap and to replace the capillary tube with one of a different bore when it is desired to measure a materially higher or lower rate of gas flow.

In the forms shown in Figs. 1 and 2, the capillary tube is arranged in vertical alignment with the inner tube 12 and its open end 18 communicates with the annular space between this tube and the top extension 30 or 32 of the outer reservoir tube. Hence, the gas which enters the inlet 16 passes through that annular space before it enters the capillary tube. If desired, the capillary tube and the inlet tube 16 may be so located and arranged that the gas passes directly in line from the inlet tube to the capillary tube which may be accomplished, as shown in Fig. 3, by placing the inlet pipe 44 in line with the capillary 45 which carries the larger tube 46 as an extension thereof. The outlet pipe 47 opens directly into the tube 46. The outer reservoir is shaped as a T, comprising the horizontal part 48 surrounding and spaced from the tubes 45 and 46 and the vertical part 49 surrounding and spaced from the inner tube 50 which communicates with the tube 46. The tube 50 is open at its lower end and is supported by tube 46 which is sealed to the wall 48. The parts 49 and 50 hold the indicating liquid and the difference in height of the two menisci indicates the pressure difference at the two ends of the capillary.

The operation of the device has been fully set forth in the above explanation and need not be here repeated. The advantages of the construction will also be readily apparent. The device is very strong in its construction and may be readily mounted on an ordinary laboratory clamp engaging the outer surface of the reservoir tube 10. It does not have to be fixed permanently on a standard. The construction is so strong that any normal force involved in applying rubber tubes to the inlet and outlet pipes will not cause breakage. The vertical tubes 10 and 12 may be graduated with scale markings so as to be read like an ordinary burette tube. The relative sizes of the two tubes 10 and 12 is of no importance, since the use of the apparatus involves merely reading the difference in liquid level. Hence the tubes may be made of such material as will give the required strength and rigidity as well as convenience in making the required readings. The inner tube 12 need not be concentric with the outer tube 10, but for convenience in manufacture this is the preferred construction.

It will now be appreciated that many modifications in structure may be made within the scope of my invention; hence the above disclosure is to be interpreted as setting forth the principles of this invention and describing preferred embodiments thereof and not as imposing limitations on the appended claims.

I claim:

1. A gas flow meter comprising a reservoir tube adapted to hold a liquid when in a substantially vertical position, an inner pressure indicating tube within and spaced from the reservoir tube which has a passage near its lower end connecting the interiors of said tubes, the upper end of the inner tube terminating in a capillary tube which opens into the space above the liquid within the reservoir tube, a gas inlet pipe communicating with said space, and a gas outlet pipe communicating with the inlet only through said capillary tube and with the inner tube at an intermediate point between the capillary and the lower end of the inner tube, said parts being so arranged that gas passing under pressure from the inlet through the capillary tube to the outlet creates a difference in gas pressure at the two ends of the capillary tube which is indicated by a lower level of the liquid in said reservoir tube than in the inner tube.

2. A gas flow meter comprising a vertical reservoir tube closed at its bottom and adapted to hold a liquid, a vertical pressure indicating tube within and spaced from the reservoir tube, said tubes communicating through a passage adjacent their lower ends, inlet and outlet tubes, a capillary tube forming the sole gas passage between the inlet and outlet tubes, said outlet tube communicating independently of the capillary tube with the upper portion of the inner tube and said inlet tube communicating with the space within the upper portion of the reservoir tube, the parts being so arranged that gas passing from the inlet through the capillary to the outlet creates a pressure difference between the inner and the reservoir tubes which causes the liquid to attain a higher level in the inner tube than in the reservoir tube.

3. A gas flow meter comprising a vertical reservoir tube closed at both ends and adapted to hold a liquid, a vertical pressure indicating tube within and spaced from the reservoir tube which indicating tube opens adjacent its lower end into the space of the reservoir tube, said inner tube terminating at its upper end in a vertical capillary tube opening into the closed space of the outer tube, and horizontal gas inlet and outlet pipes arranged substantially in alignment, the inlet pipe opening into the outer reservoir space and communicating therethrough with the open end of the capillary bore, the outlet pipe communicating only with an intermediate portion of the inner tube and independently with the inlet through said capillary tube, said tubes being so arranged that the contained liquid indicates by a difference in level a pressure difference at the opposite ends of the capillary tube.

4. A gas flow meter comprising a reservoir tube open at its upper end and adapted to hold a liquid when held vertically, a removable stopper arranged to seal the upper end of said tube, a pressure indicating tube within the reservoir tube and rigidly secured thereto at its lower end, the inner tube communicating near its lower end with the reservoir space and having an open upper end, a capillary tube removably fitted on the upper end of said inner tube and arranged to form a continuation thereof, a gas inlet pipe opening into the upper portion of the reservoir space, and a gas outlet pipe rigidly connected to the reservoir tube wall and communicating only with the interior of the inner tube, said parts being so constructed and arranged that when gas passes under pressure from the inlet to the outlet pipe the difference in pressure at the two ends of the capillary tube is indicated by a difference in level of a liquid in said tubes.

LORING COES, JR.